United States Patent
Aiba

(10) Patent No.: US 12,431,977 B2
(45) Date of Patent: Sep. 30, 2025

(54) TRANSMISSION DEVICE AND SIGNAL TRANSMISSION SYSTEM

(71) Applicant: Yazaki Corporation, Tokyo (JP)

(72) Inventor: Takamitsu Aiba, Kanagawa (JP)

(73) Assignee: YAZAKI CORPORATION, Tokyo (JP)

( * ) Notice: Subject to any disclaimer, the term of this patent is extended or adjusted under 35 U.S.C. 154(b) by 238 days.

(21) Appl. No.: 18/449,833

(22) Filed: Aug. 15, 2023

(65) Prior Publication Data

US 2024/0063908 A1 Feb. 22, 2024

(30) Foreign Application Priority Data

Aug. 22, 2022 (JP) ................................. 2022-131613

(51) Int. Cl.
H04B 10/2575 (2013.01)
(52) U.S. Cl.
CPC .............................. *H04B 10/2575* (2013.01)
(58) Field of Classification Search
None
See application file for complete search history.

(56) References Cited

U.S. PATENT DOCUMENTS 8,396,369 B1 * 3/2013 Farmer ............ H04B 10/25754
398/115
2021/0367671 A1 11/2021 Yamamoto et al.

FOREIGN PATENT DOCUMENTS

| JP | 2017-034338 A |   | 2/2017 |
| JP | 2019135801 A | * | 8/2019 |
| JP | 2020-77934 A |   | 5/2020 |
| JP | 2021-129234 A |   | 9/2021 |

* cited by examiner

*Primary Examiner* — David W Lambert
(74) *Attorney, Agent, or Firm* — Sughrue Mion, PLLC

(57) ABSTRACT

A transmission device includes an RF signal generation unit, a pulse signal generation unit, a coupling unit, a linear driver, and a light-emitting element. The RF signal generation unit generates an RF signal to be modulated by a carrier wave. The pulse signal generation unit generates a pulse signal. The coupling unit couples the RF signal and the pulse signal to each other and generate a superimposed signal. The linear driver amplifies the superimposed signal and generate an amplified signal. The light-emitting element converts the amplified signal to an optical signal and generate a superimposed optical signal. The pulse signal generation unit generates the pulse signal in such a way to satisfy $fr=n \times fs$, where fr is a carrier wave frequency of the RF signal, fs is a first frequency being a reciprocal of a modulation speed of the pulse signal, and n is a natural number.

5 Claims, 16 Drawing Sheets

TRANSMISSION DEVICE AND SIGNAL TRANSMISSION SYSTEM

CROSS-REFERENCE TO RELATED APPLICATIONS

The present application is based on, and claims priority from Japanese Patent Application No. 2022-131613, filed on Aug. 22, 2022, the entire contents of which are incorporated herein by reference.

BACKGROUND OF THE INVENTION

Technical Field

The present disclosure relates to a transmission device and a signal transmission system.

Background

In optical communication using an optical fiber as a transmission path, it has hitherto been proposed a method of superimposing and transmitting a pulse signal and a radio frequency (RF) signal. JP 2017-34338 A discloses a wireless communication system that wirelessly transmits, from a transmission device to a reception device, a superimposed signal obtained by superimposing a transmission signal and an interference signal.

SUMMARY OF THE INVENTION

A high-speed pulse signal applied to the wireless communication system disclosed in JP 2017-34338 A has a frequency component over a broad band. Thus, in the wireless communication system that transmits a high-speed pulse signal, the high-speed pulse signal is superimposed with a frequency component of an RF signal transmitted by a carrier wave such as a wireless signal, and a noise component is generated in each of the pulse signal and the RF signal. As a result, it may be difficult to transmit the pulse signal and the RF signal at the same time.

The present disclosure has been made in view of such a problem in the related art. Further, an object of the present invention is to provide a transmission device capable of transmitting a pulse signal and an RF signal in one transmission path with high quality.

A transmission device according to an aspect of the present disclosure includes an RF signal generation unit configured to generate an RF signal to be modulated by a carrier wave, a pulse signal generation unit configured to generate a pulse signal, a coupling unit configured to couple the RF signal and the pulse signal to each other and generate a superimposed signal, a linear driver configured to amplify the superimposed signal and generate an amplified signal, a light-emitting element configured to convert the amplified signal to an optical signal and generate a superimposed optical signal, wherein the pulse signal generation unit generates the pulse signal in such a way to satisfy $$fr = n \times fs \quad (1)$$

where fr is a carrier wave frequency of the RF signal, fs is a first frequency being a reciprocal of a modulation speed of the pulse signal, and n is a natural number.

A signal transmission system according to another aspect of the present disclosure includes the transmission device described above, a transmission path configured to transmit the superimposed optical signal output from the transmission device, and a reception device configured to receive the superimposed optical signal from the transmission path, wherein the reception device includes a light-receiving element configured to receive the superimposed optical signal and convert the superimposed optical signal into a superimposed electric signal, a splitting unit configured to split the superimposed electric signal, an RF signal demodulation unit configured to amplify one part of the superimposed electric signal being split by the splitting unit and demodulate the one part to the RF signal, and a pulse signal demodulation unit configured to amplify another part of the superimposed electric signal being split by the splitting unit and demodulate the another part to the pulse signal.

DETAILED DESCRIPTION OF THE INVENTION

Figure 1:
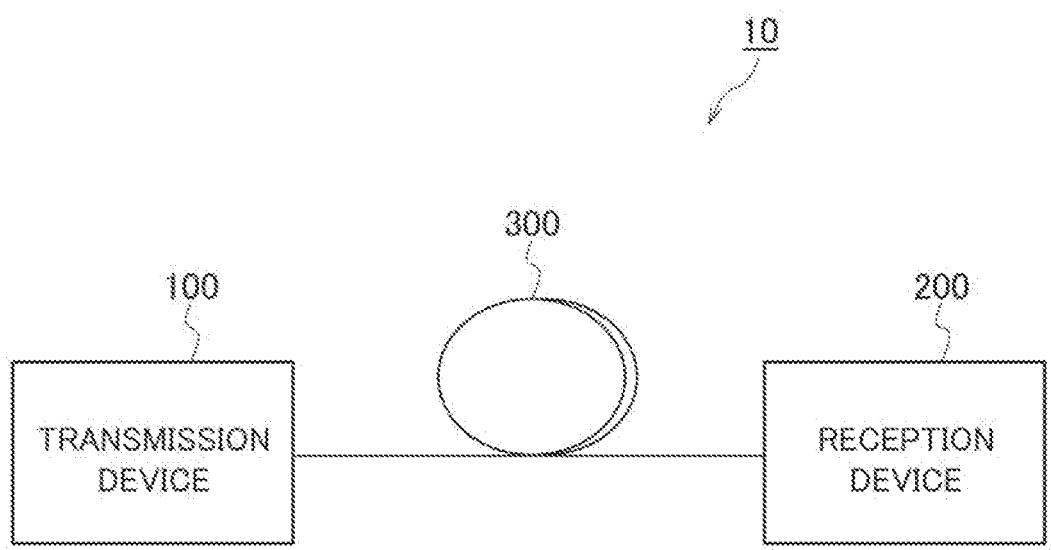
FIG. 1 is a diagram illustrating a configuration of a signal transmission system according to a first embodiment.

Various embodiments will be described hereinafter with reference to the accompanying drawings.

With reference to the drawings, a signal transmission system 10 according to the present embodiment is described below in detail. Note that dimensional ratios in the drawings are exaggerated for convenience of description, and may be different from actual ratios. Further, in the following description of the drawings, the same or similar parts are denoted with the same or similar reference symbols.

(Signal Transmission System 10)

In the signal transmission system 10 according to the present embodiment, a pulse signal indicated with a pulse waveform and a radio frequency (RF) signal (high-frequency wireless signal) are superimposed with each other, and are transmitted in a form of an optical signal. In places such as houses or vehicles, wiring is performed by using separate signal lines for a pulse signal of a Local Area Network (LAN) and an RF signal received from an antenna. Thus, the number of wires is increased, and thus increase in costs and difficulty in reducing the number of wires are caused. Further, the RF signal has a high frequency due to a carrier wave. Thus, when the RF signal is transmitted in a coaxial cable or the like, the frequency is reduced to an intermediate frequency (IF) or the like. In the present embodiment, a signal obtained by superimposing the pulse signal and the RF signal at the electric stage is converted into light, and is transmitted in a transmission path in one optical fiber.

First Embodiment

FIG. 1 is a diagram illustrating a configuration of the signal transmission system 10 according to the first embodiment. As illustrated in FIG. 1, the signal transmission system 10 is configured to include a transmission device 100, a reception device 200, and a transmission path 300.

(Transmission Device 100)

Figure 2:
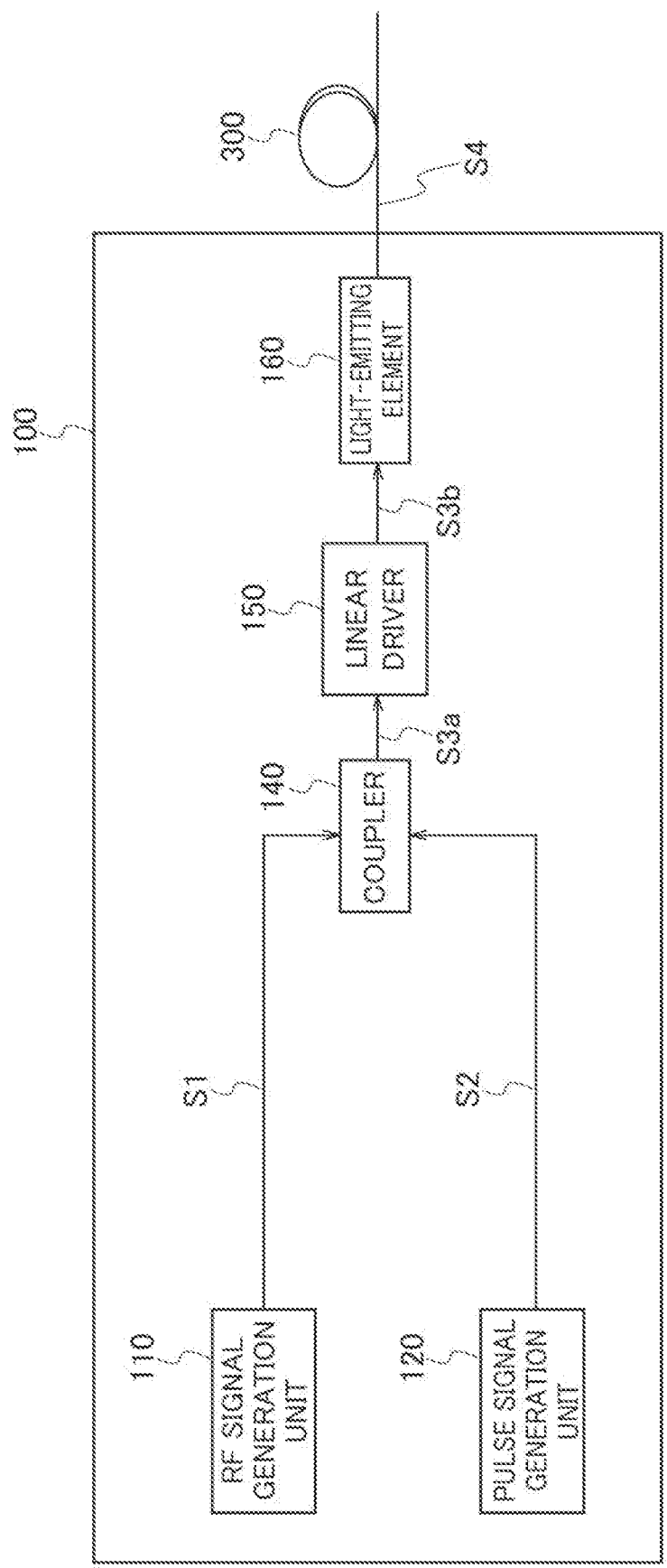
FIG. 2 is a block diagram illustrating a configuration of a transmission device according to the first embodiment.

The transmission device 100 is a device that superimposes and transmits the pulse signal and the RF signal. FIG. 2 is a block diagram illustrating a configuration of the transmission device 100 according to the first embodiment. As illustrated in FIG. 2, the transmission device 100 is configured to include an RF signal generation unit 110, a pulse signal generation unit 120, a coupling unit 140, a linear driver 150, and a light-emitting element 160. Note that the transmission device 100 may be configured as a transmission/reception device including a reception device.

The RF signal generation unit 110 generates an RF signal S1 that is to be modulated by a carrier wave or is modulated by a carrier wave, and outputs the RF signal S1. Note that, in the present embodiment, the RF signal S1 generated by the RF signal generation unit 110 may be a signal that is input from the outside, such as a signal for terrestrial digital broadcasting or a mobile phone. In this case, the RF signal generation unit 110 outputs the RF signal S1 that is input from the outside, to the coupling unit 140 described later.

The pulse signal generation unit 120 generates a pulse signal S2, and outputs the pulse signal S2 to the coupling unit 140 described later. The pulse signal generation unit 120 receives a digital signal (omitted in illustration) from the outside, and generates a pulse signal, based on the digital signal being input. Note that the first embodiment is not limited to the configuration in which the digital signal is generated based on the signal that is input from the outside, and a configuration in which the pulse signal generation unit 120 generates a digital signal and outputs the pulse signal S2.

Figure 3A:
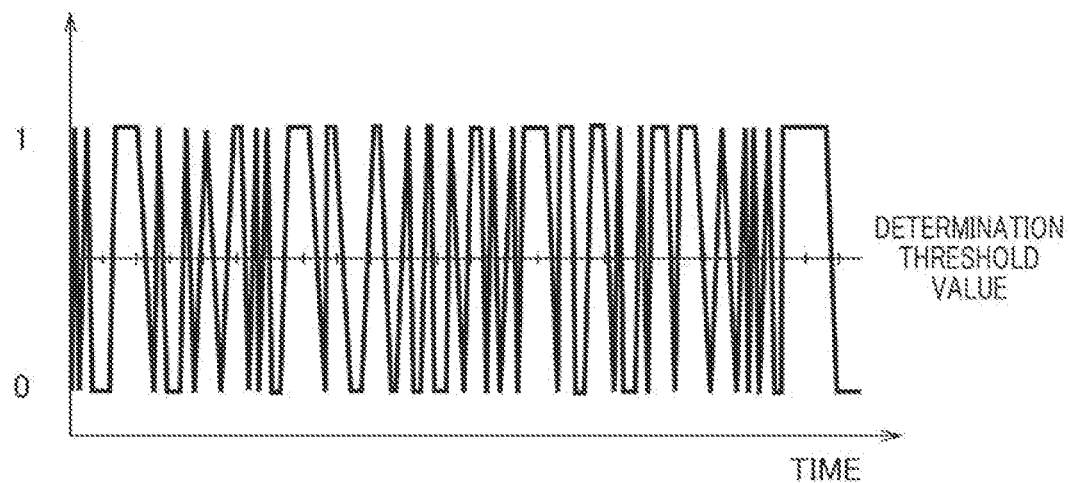
FIG. 3A is a diagram illustrating an example of a waveform of a pulse signal in a time region.
Figure 3B:
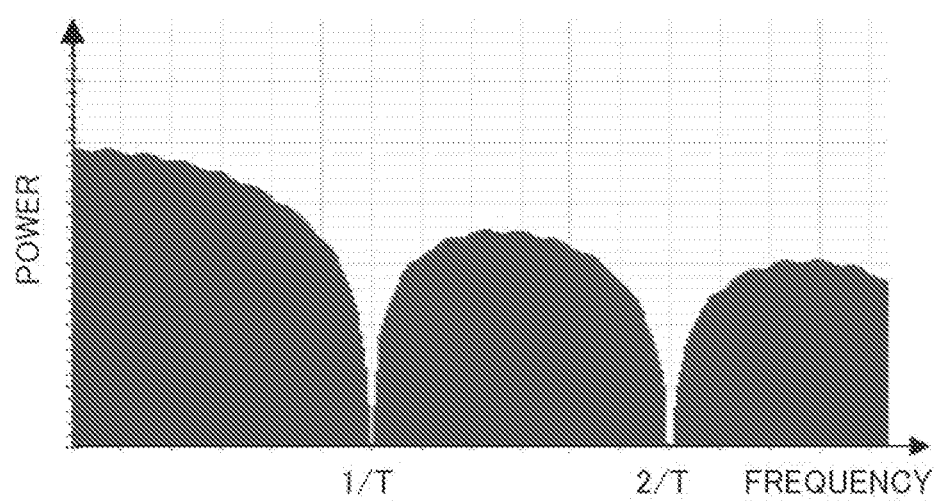
FIG. 3B is a diagram illustrating an example of a waveform of the pulse signal in a frequency region.
Figure 4A:
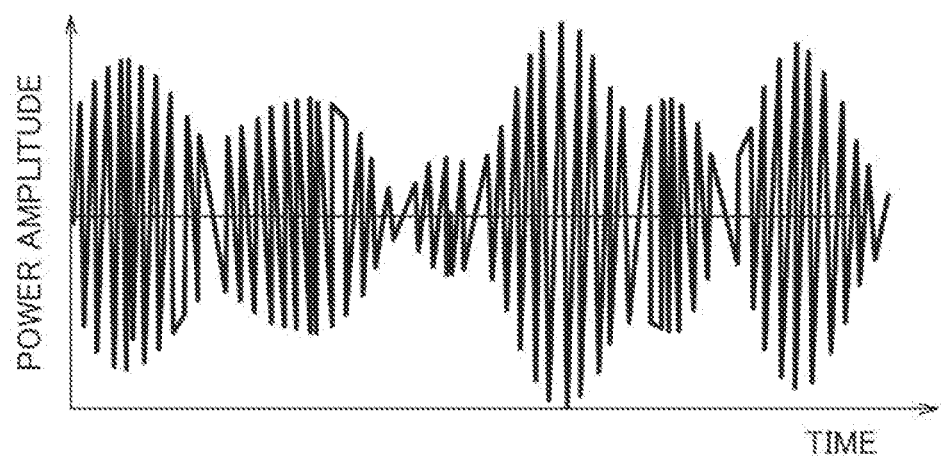
FIG. 4A is a diagram illustrating an example of a waveform of an RF signal in a time region.
Figure 4B:
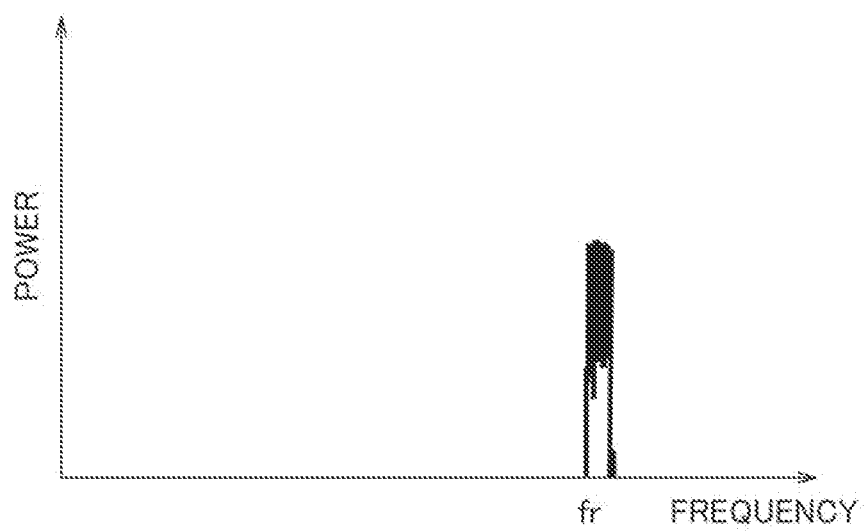
FIG. 4B is a diagram illustrating an example of a waveform of the RF signal in a frequency region.

FIG. 3A is a diagram illustrating an example of a waveform of a pulse signal in a time region. Further, FIG. 3B is a diagram illustrating an example of a waveform in a frequency region, which is indicated by subjecting the pulse signal to Fourier transform. Further, FIG. 4A is a diagram illustrating an example of a waveform of an RF signal in a time region. Further, FIG. 4B is a diagram illustrating an example of a waveform in a frequency region, which is indicated by subjecting the RF signal to Fourier transform.

In the first embodiment, the pulse signal generation unit 120 performs modulation at a predetermined frequency to generate the pulse signal. Specifically, the pulse signal generation unit 120 generates the pulse signal in such a way to satisfy $$fr = n \times fs \quad (1)$$

where fr is a carrier wave frequency of the RF signal, fs is a frequency being a reciprocal of a modulation speed T of the pulse signal (hereinafter, referred to as a first frequency fs), and n is a natural number.

Note that, in the example illustrated in FIG. 3B, the first frequency fs being a reciprocal of the modulation speed T of the pulse signal is a frequency denoted with 1/T.

The pulse signal generation unit 120 generates the pulse signal in such a way to satisfy Expression (1), and thus can suppress mutual interference between the RF signal S1 and the pulse signal S2. Further, the natural number n in Expression (1) is a value equal to or greater than 2. With this, the carrier wave frequency fr of the RF signal is equal to or greater than twice the first frequency fs being a reciprocal of the modulation speed of the pulse signal, and is located at the bottom of the signal where power of the pulse signal is close to 0 in the frequency region. Thus, mutual interference between the RF signal S1 and the pulse signal can be suppressed.

Figure 5:
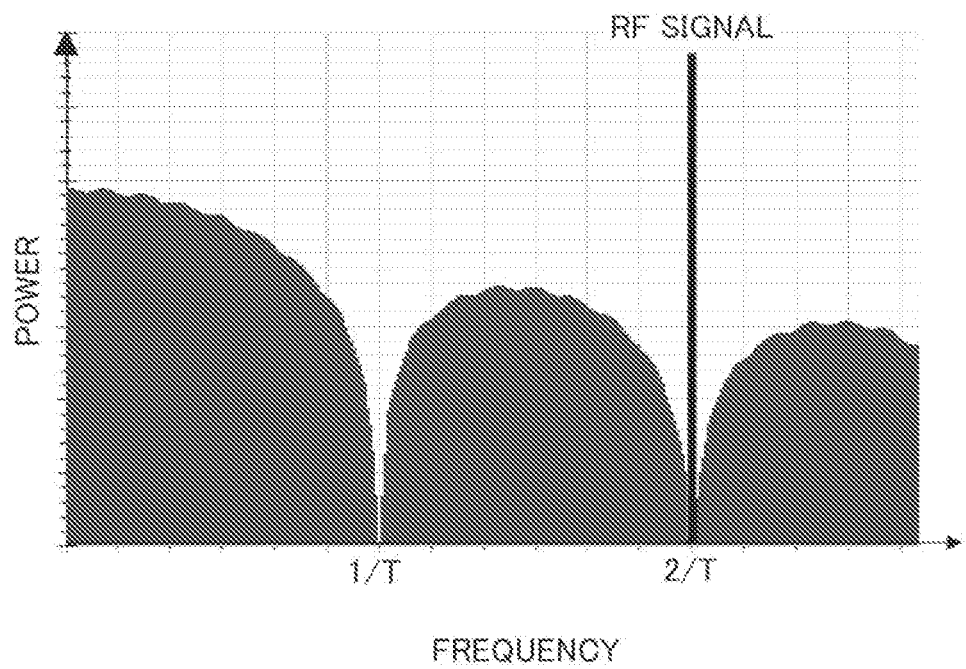
FIG. 5 is a diagram illustrating an example of a waveform obtained by coupling the pulse signal and the RF signal in the first embodiment.

The coupling unit 140 includes a function of generating a superimposed signal S3 obtained by superimposing the RF signal S1 and the pulse signal S2. As an example of the coupling unit 140, a directional coupler is given. FIG. 5 is a diagram illustrating a waveform of the superimposed signal S3, which is obtained by superimposing the RF signal S1 and the pulse signal S2, in the frequency region. In the superimposed signal S3 that is superimposed by the coupling unit 140 of the transmission device according to the first embodiment, mutual interference between the RF signal S1 and the pulse signal S2 is suppressed as illustrated in FIG. 5. Further, in the example illustrated in FIG. 5, a case in which the value of the natural number n in Expression (1) is 2 is illustrated. As illustrated in FIG. 5, the carrier wave frequency fr of the RF signal is twice the first frequency fs being a reciprocal of the modulation speed of the pulse signal, and is located at the bottom of the signal where power of the pulse signal is close to 0 in the frequency region. Thus, mutual interference between the RF signal S1 and the pulse signal can be suppressed.

The linear driver 150 generates an amplified signal S3b obtained by amplifying the superimposed signal S3a output from the coupling unit 140, and outputs the amplified signal S3b to the light-emitting element 160. Further, in the present embodiment, the linear driver 150 corresponds to an amplifier for driving the light-emitting element 160.

The light-emitting element 160 is an element that converts an electric signal into an optical signal. The light-emitting element 160 is connected to the linear driver 150 and the transmission path 300. The light-emitting element 160 converts the amplified signal S3b output from the linear driver 150 into a superimposed optical signal S4 (optical signal), and transmits the superimposed optical signal S4 to the transmission path 300. Note that the light-emitting element 160 includes an electro-optical conversion function. The light-emitting element 160 may be an element such as a laser diode and a light-emitting diode (LED). In the transmission device 100, one light-emitting element 160 is capable of performing conversion into an optical signal, and hence increase in the number of constituent components in the system can be suppressed.

The transmission path 300 is one communication line for connecting the transmission device 100 and the reception device 200 to each other. As an example of the transmission path 300, an optical fiber is given. For example, the optical fiber is made of glass or a resin. For example, the optical fiber is configured to include a core layer through which the optical signal propagates, a clad layer that surrounds the periphery of the core layer. In the optical fiber, the optical signal is totally reflected at the boundary surface between the core layer and the clad layer at a predetermined angle, and thus the optical signal propagates within the core layer. A line wire diameter of the optical fiber can be smaller than that of a metal wire, and reduction in weight of the optical fiber is also achieved.

(Reception Device 200)

Figure 6A:
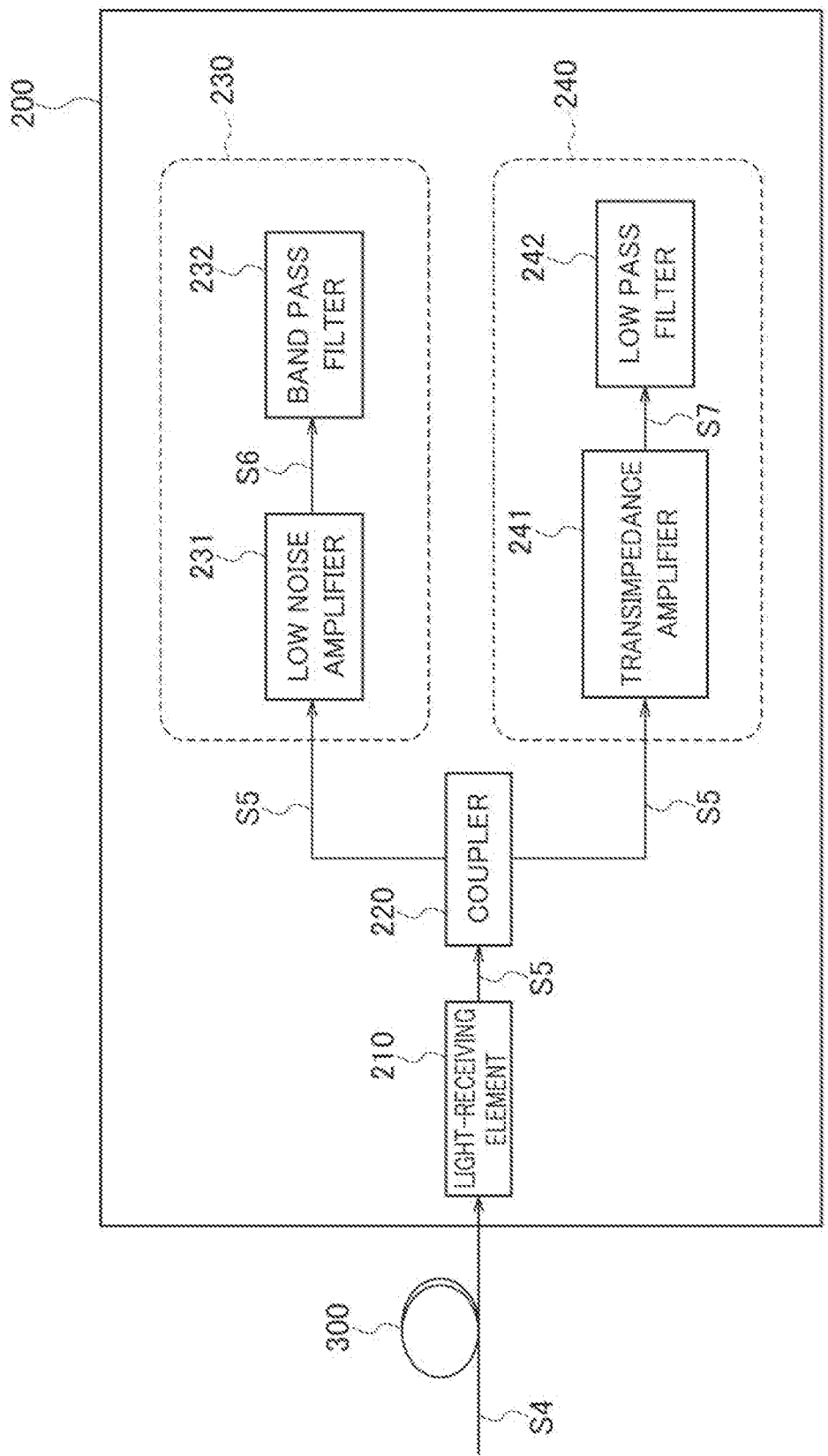
FIG. 6A is a block diagram illustrating an example of a configuration of a reception device according to the first embodiment

The reception device 200 is a device that receives a signal. As illustrated in FIG. 6A, the reception device 200 is configured to include a light-receiving element 210, a coupler 220, an RF signal demodulation unit 230, and a pulse signal demodulation unit 240. Note that the reception device 200 may be configured as a transmission/reception device including a transmission device.

The light-receiving element 210 converts the superimposed optical signal S4 transmitted from the transmission path 300 into a superimposed electric signal S5. The superimposed electric signal S5 that is output from the light-receiving element 210 is split by the coupler 220. One part of the superimposed electric signal S5 that is split by the coupler 220 is transmitted to the RF signal demodulation unit 230. Further, another part of the superimposed electric signal S5 that is split by the coupler 220 is transmitted to the pulse signal demodulation unit 240. Note that the coupler 220 corresponds to a splitting unit.

Figure 7A:
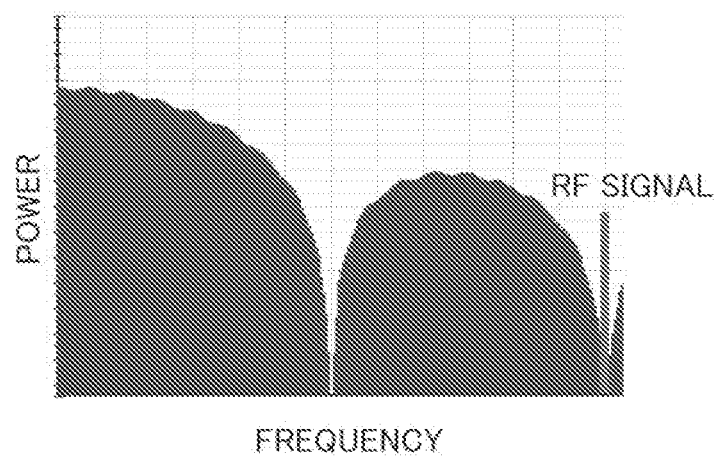
FIG. 7A is a diagram illustrating an example of a waveform demodulated by a pulse signal demodulation unit of the reception device according to the first embodiment.
Figure 7B:
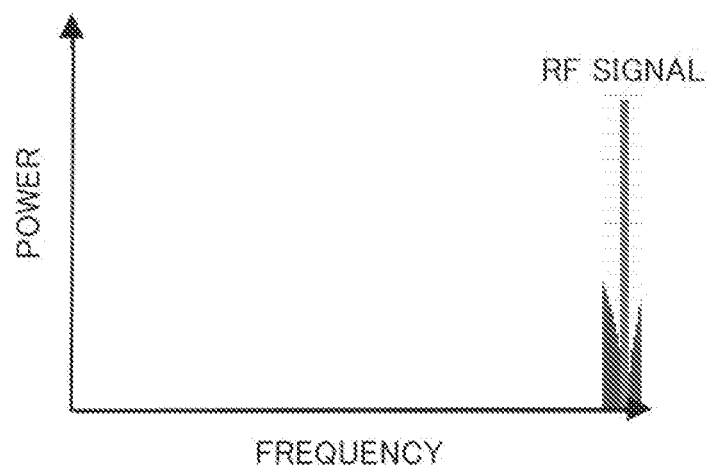
FIG. 7B is a diagram illustrating an example of a waveform demodulated by an RF signal demodulation unit of the reception device according to the first embodiment.
Figure 7C:
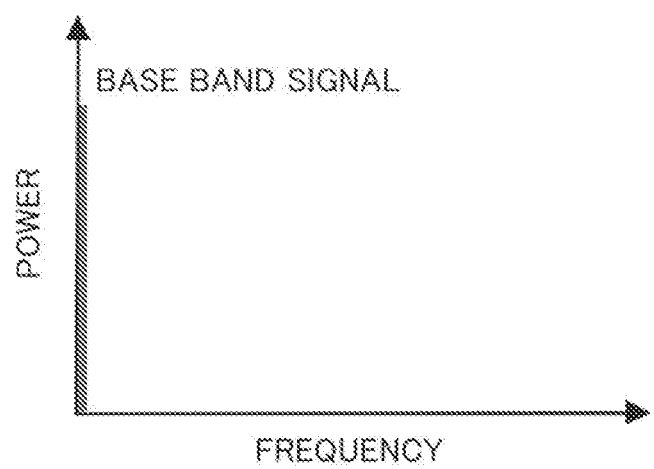
FIG. 7C is a diagram illustrating an example of a waveform in a case in which a signal demodulated by the RF signal demodulation unit of the reception device according to the first embodiment is down-converted into a base band.

The RF signal demodulation unit 230 includes a low noise amplifier 231 and a band pass filter 232. The low noise amplifier 231 is an amplifier that has a gain at a frequency being the carrier wave frequency fr of the RF signal, and outputs an amplified electric signal S6. Further, the band pass filter 232 is a band pass filter having a signal band width equal to or more than the first frequency fs of the pulse signal. The low noise amplifier 231 and the band pass filter 232 extract the RF signal from the superimposed optical signal S4. In other words, the RF signal demodulation unit 230 includes a function of amplifying an demodulating the superimposed electric signal S5 to the RF signal. FIG. 7B is a diagram illustrating an example of the RF signal that is demodulated by the RF signal demodulation unit 230. Further, FIG. 7C is a diagram illustrating an example of a waveform in a case in which the RF signal being demodulated is down-converted into a base band to obtain a base band signal.

The pulse signal demodulation unit 240 includes a transimpedance amplifier 241 and a low pass filter 242. The transimpedance amplifier 241 is an amplifier having a band of the first frequency, and outputs an amplified electric signal S7. Further, the low pass filter 242 is used to remove the RF signal. The transimpedance amplifier 241 and the low pass filter 242 extract the pulse signal from the superimposed optical signal S4. In other words, the pulse signal demodulation unit 240 includes a function of amplifying and demodulating the superimposed electric signal S5 to the pulse signal. FIG. 7A is a diagram illustrating an example of the pulse signal being demodulated. As illustrated in FIG. 7A, the signal that is demodulated by the pulse signal demodulation unit 240 includes the RF signal, but the RF signal is suppressed to an extent not affecting the pulse signal.

Figure 6B:
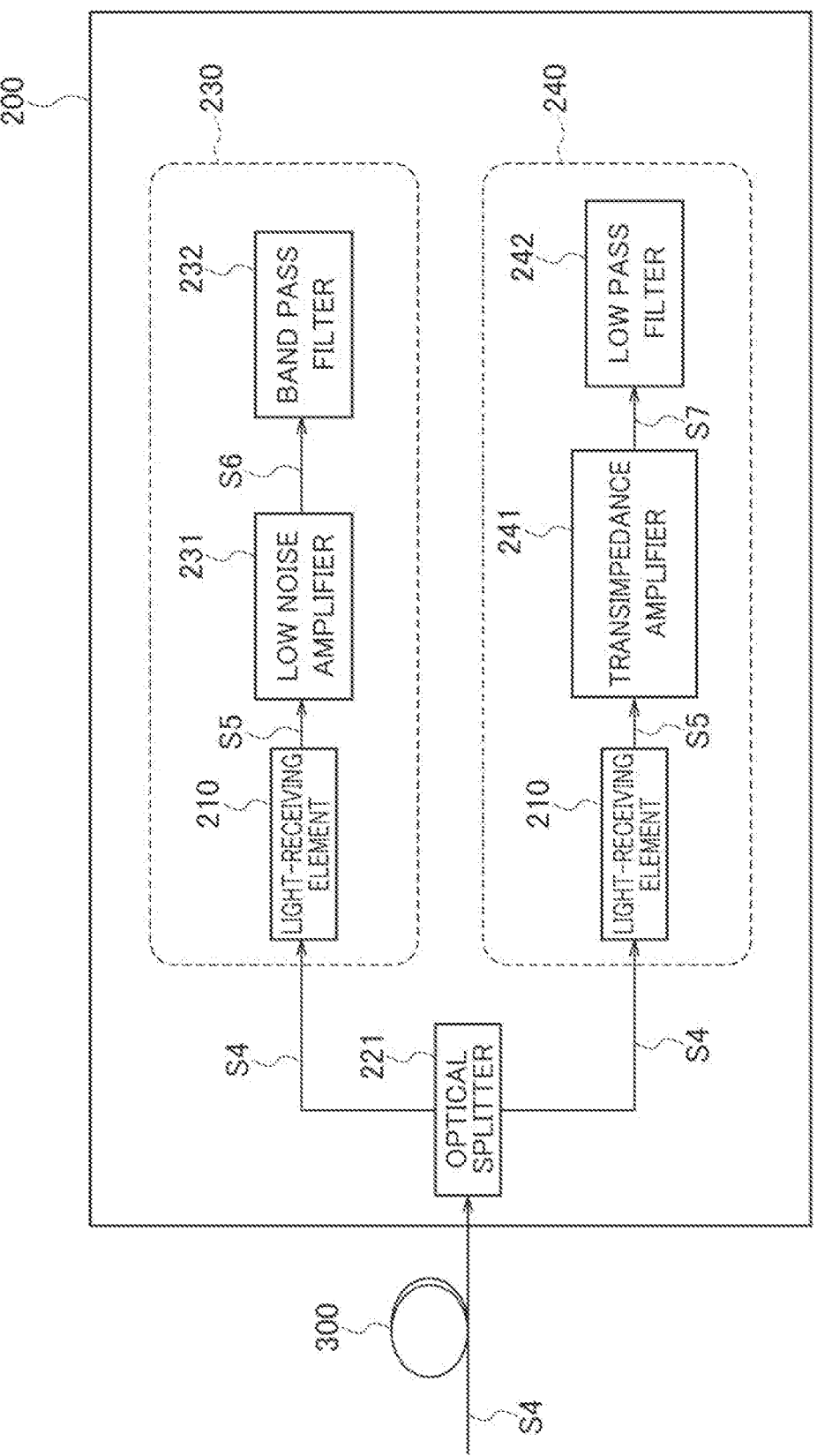
FIG. 6B is a block diagram illustrating an example of a configuration of the reception device according to the first embodiment.

Note that, as illustrated in FIG. 6B, the reception device 200 may include an optical splitter 221, and may be configured to extract the RF signal and the pulse signal by the RF signal demodulation unit 230 and the pulse signal demodulation unit 240, respectively, after splitting the superimposed optical signal S4. In this case, the light-receiving element 210 is applicable to each part of the superimposed optical signal S4 that is split by the optical splitter 221, and a frequency component to be removed from each part may be suppressed at the stage of the light-receiving element 210.

Further, the optical splitter 221 splits the superimposed optical signal S4 at a constant ratio (for example, a ratio of 1:1). Note that the splitting ratio is not limited to 1:1, and the superimposed optical signal S4 may be split at any other ratios.

In the first embodiment, a cut-off frequency fc of the low pass filter 242 is determined and set in advance through calculation. The cut-off frequency fc is determined by Expression (2) to Expression (4) given below, based on a relationship between the carrier wave frequency fr of the RF signal S1 that is output from the RF signal generation unit 110 and the first frequency fs being a reciprocal of the modulation speed T in the pulse signal generation unit 120.

First, in a case of fr≥2×fs, in other words, in a case in which the carrier wave frequency fr of the RF signal is equal to or greater than twice of the first frequency fs, the cut-off frequency fc satisfying the relationship in Expression (2) given below is applied. Note that γ is an order of the low pass filter 242.

$$0.6 \times fs \leq fc(\gamma \geq 4) \leq 1 \times fs \quad (2)$$

Further, in a case of 1.2×fs≤fr<2×fs, in other words, the carrier wave frequency fr of the RF signal is equal to or greater than 1.2 times and less than twice the first frequency fs, the cut-off frequency fc satisfying the relationship in Expression (3) given below is applied. However, γ satisfies 4≤γ≤7.

$$0.6 \times fs \leq fc(\gamma) \leq 0.75 \times fs \quad (3)$$

Moreover, in a case of 1.2×fs=fr, in other words, the carrier wave frequency fr is 1.2 times the first frequency fs, the cut-off frequency fc satisfying the relationship in Expression (4) given below is applied.

$$fc(\gamma \geq 7) \leq 0.75 \times fs \quad (4)$$

Note that, in the first embodiment, the carrier wave frequency fr and the first frequency fs that satisfy the relationship of fr<1.2×fs do not fall within the application range.

Figure 8A:
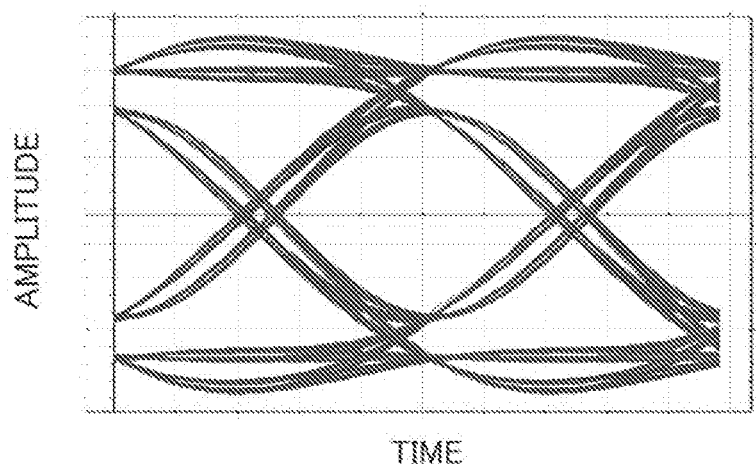
FIG. 8A is a diagram for describing an eye pattern with respect to a cut-off frequency according to the first embodiment.
Figure 8B:
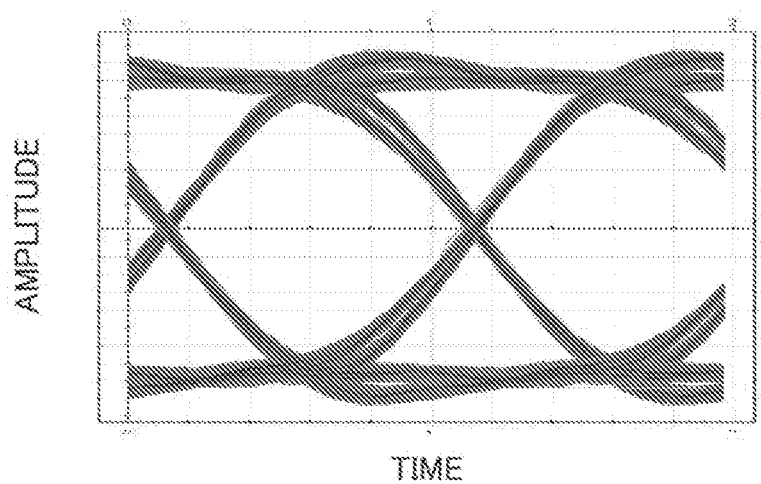
FIG. 8B is a diagram for describing the eye pattern with respect to the cut-off frequency according to the first embodiment.
Figure 8C:
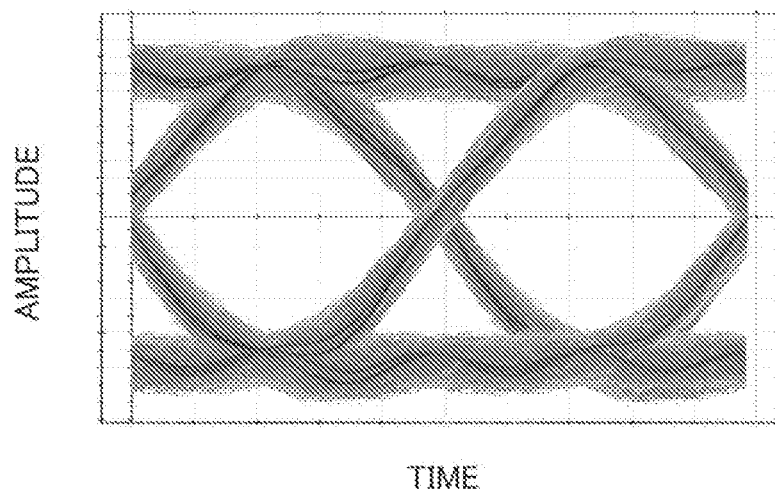
FIG. 8C is a diagram for describing the eye pattern with respect to the cut-off frequency according to the first embodiment.

FIG. 8A to FIG. 8C are diagrams illustrating eye patterns at the time of changing the cut-off frequency fc while using a fourth-order Butterworth low pass filter (LPF) as the low pass filter 242. FIG. 8A illustrates an example in which the cut-off frequency fc is 0.5×the first frequency fs=600 MHz. Further, FIG. 8B illustrates an example in which the cut-off frequency fc is 0.5×the first frequency fs=900 MHz. Moreover, FIG. 8C illustrates a case in which the cut-off frequency fc is the first frequency fs=1200 MHz.

As illustrated in FIG. 8A, it is understood that, as the cut-off frequency fc is lower, an influence of interference between the signals is greater, which degrades a quality factor (Q factor). For example, in the example in FIG. 8A, a high-frequency component of the pulse signal is suppressed by the low pass filter 242, resulting in attenuation of an amplitude of a (shortest) pulse waveform that is shortest at Level 1. In contrast, when the pulse waveform that is continuously at Level 1 has a larger number of low-frequency components, resulting in less attenuation of the amplitude.

Thus, in the eye pattern illustrated in FIG. 8A, an amplitude difference causes a state, which is so-called interference between the signals, and the Q factor is degraded.

Further, as illustrated in FIG. 8C, as the cut-off frequency fc is higher, the Q factor is degraded due to an influence of the RF signal. This is because, in FIG. 8C, power of the RF signal is large and the RF signal is regarded as a noise with respect to the pulse signal, and hence the Q factor is degraded.

In general, when the RF signal is superimposed with the pulse signal, the RF signal is regarded as a noise. Thus, power of the RF signal that is suppressed by the filter and an amplitude of the pulse signal determine the Q factor. In the present embodiment, the Q factor is indicated with Q=(a signal amplitude)/(an rms noise of a signal at Level 0+an rms noise of a signal at Level 1) (rms: root mean square).

Figure 9:
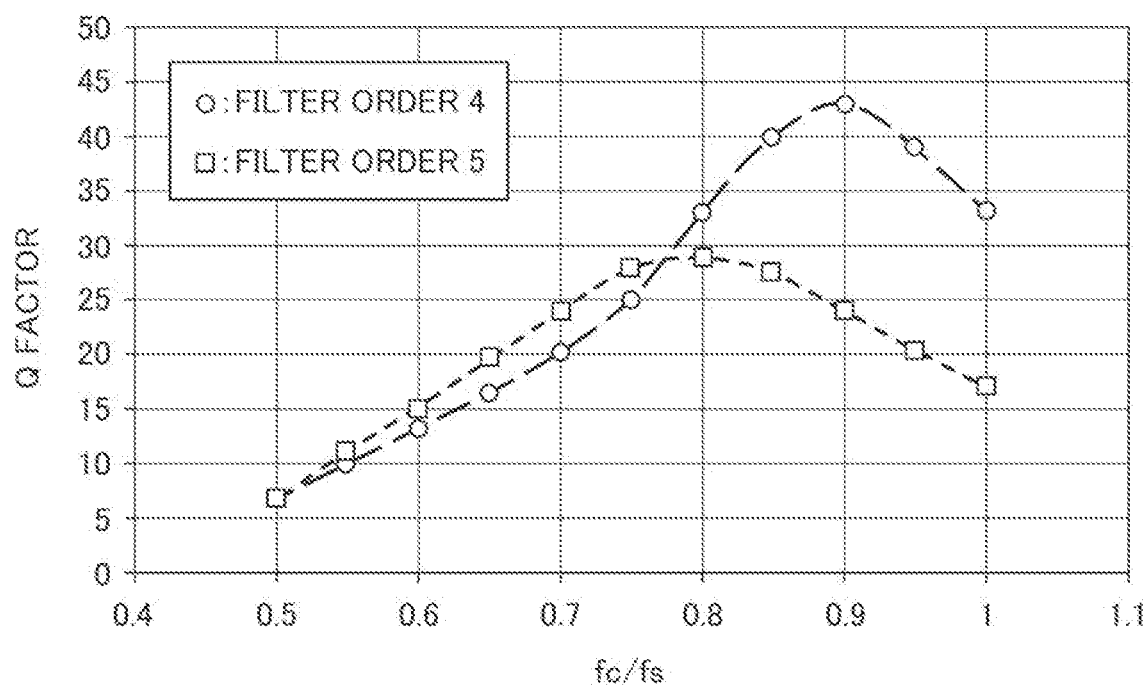
FIG. 9 is a diagram for describing a change of a Q factor with respect to the cut-off frequency according to the first embodiment.

FIG. 9 is a graph showing a change of the Q factor with respect to the cut-off frequency fc when the filter order of the low pass filter 242 is four and five. The horizontal axis in FIG. 9 indicates fc/fs being a ratio of the cut-off frequency fc and the first frequency fs. Further, the vertical axis of FIG. 9 indicates the Q factor with respect to fc/fs. As illustrated in FIG. 9, as the order of the low pass filter 242 is higher, an attenuation rate of the Q factor is increased. Thus, the order of the low pass filter 242 is higher, an effect of removing the RF signal is exerted more. However, when the cut-off frequency fc is excessively reduced, a frequency component of the pulse signal is also removed, resulting in a greater influence of interference between the signals. Thus, a lower limit of the cut-off frequency fc can be lower as the order of the low pass filter 242 is lower. Further, an upper limit of the cut-off frequency fc is higher as the order is higher, but the upper limit of the cut-off frequency fc depends on the first frequency fs and the carrier wave frequency fr.

Figure 10A:
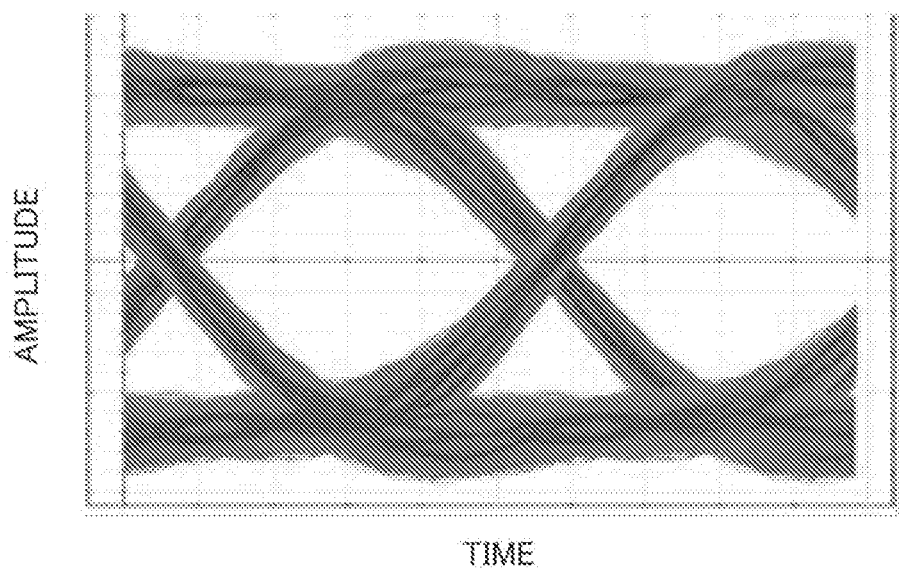
FIG. 10A is a diagram for describing an eye pattern with respect to a filter order of a low pass filter of the reception device according to the first embodiment.
Figure 10B:
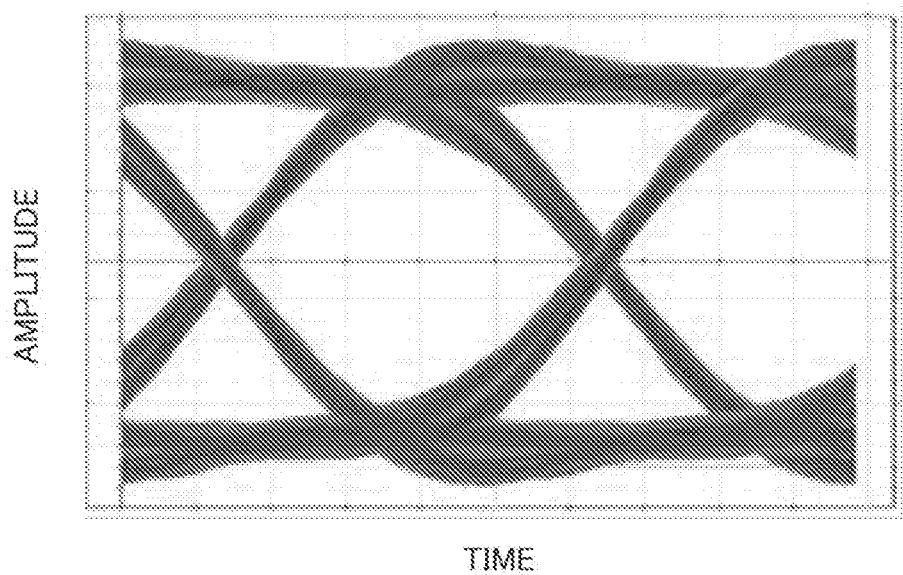
FIG. 10B is a diagram for describing the eye pattern with respect to the filter order of the low pass filter of the reception device according to the first embodiment.
Figure 14:
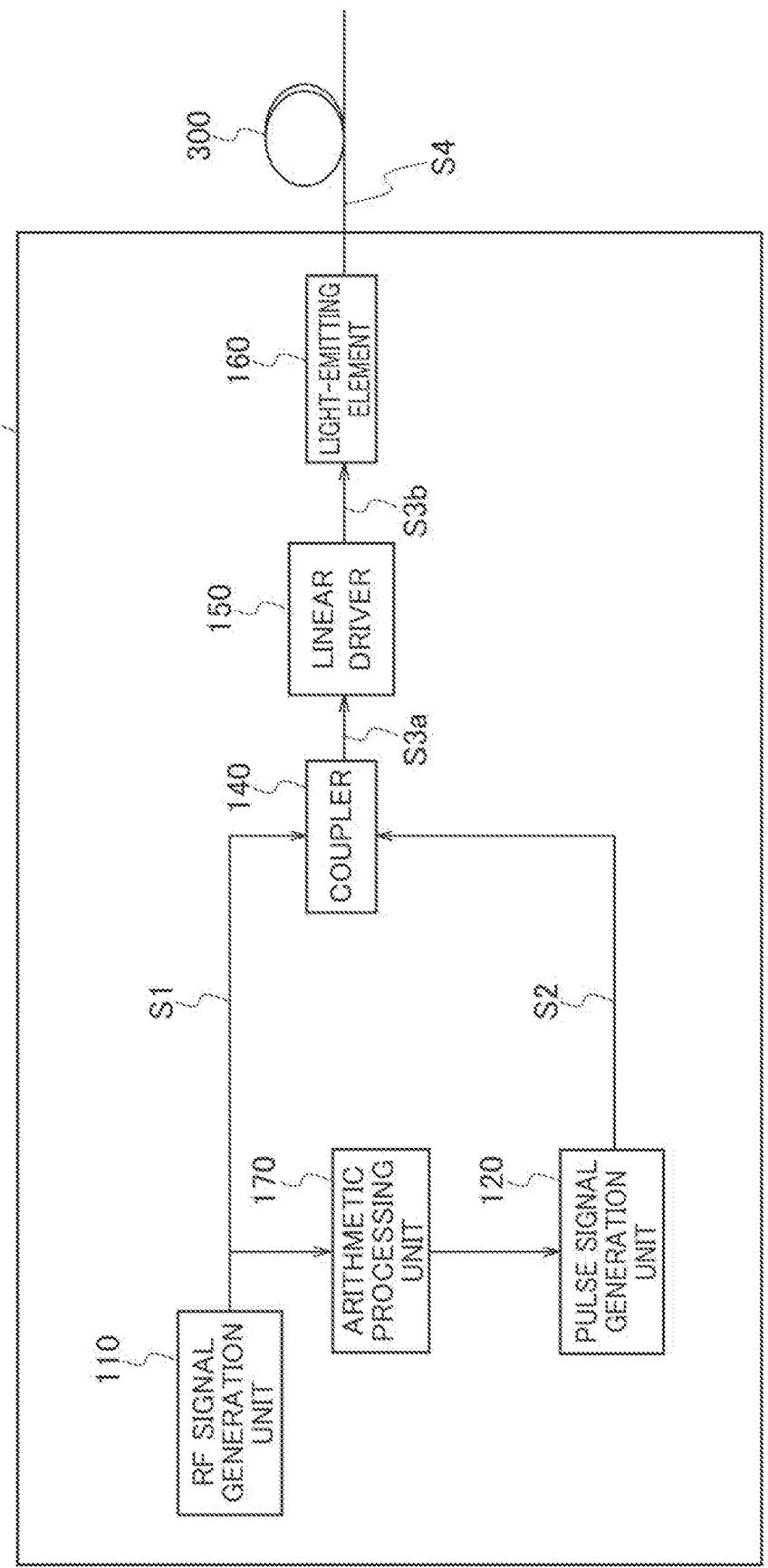
FIG. 14 is a block diagram illustrating a transmission device according to a third embodiment.

FIG. 10A and FIG. 10B illustrate eye patterns when the carrier wave frequency fr of the RF signal illustrated in FIG. 8A to FIG. 8C is changed from 2.4 GHz to 1.8 GHz. FIG. 10A illustrates an example in which the order of the low pass filter 242 is 4 and the Q factor is 14. Further, FIG. 10B illustrates an example in which the order of the low pass filter 242 is 5 and the Q factor is 20. As illustrated in FIG. 10A and FIG. 10B, 14 is obtained as the Q factor when the order of the low pass filter 242 is 4, and the Q factor is improved to 20 when the order of the low pass filter 242 is 5. This is because an attenuation rate of the Butterworth low pass filter is indicted with 6 dB×the order and a frequency attenuation of the carrier wave frequency fr of the RF signal is increased by increasing the order. In other words, the signal transmission system 10 includes the low pass filter 242 satisfying Expressions (2) to (4), and thus enables demodulation of the RF signal and the pulse signal while suppressing an influence of interference between the signals.

As described above, the transmission device 100 according to the first embodiment includes the RF signal generation unit 110, the pulse signal generation unit 120, the coupling unit 140, the linear driver 150, and the light-emitting element 160. The RF signal generation unit 110 generates the RF signal to be modulated by the carrier wave. The pulse signal generation unit 120 generates the pulse signal. The coupling unit 140 couples the RF signal and the pulse signal to each other and generate the superimposed signal. The linear driver 150 amplifies the superimposed signal and generates the amplified signal. The light-emitting element 160 converts the amplified signal to the optical signal, and generates the superimposed optical signal. The pulse signal generation unit 120 generates the pulse signal in such a way to satisfy fr=n×fs, where fr is the carrier wave frequency of the RF signal, fs is the first frequency being a reciprocal of the modulation speed of the pulse signal, and n is the natural number.

With this, the transmission device 100 according to the first embodiment can suppress mutual interference between the RF signal S1 and the pulse signal. Further, as compared to a signal transmission method involving wavelength multiplexing in the related art, the transmission device 100 does not require a plurality of light sources or wavelength filters, can suppress increase in the number of constituent components in the system, and can suppress manufacturing costs by suppressing increase in the size of the system.

Further, the natural number n in Expression (1) given above is equal to or greater than 2. With this, the carrier wave frequency fr of the RF signal is twice the first frequency fs being a reciprocal of the modulation speed of the pulse signal, and is located at the bottom of the signal where power of the pulse signal is close to 0 in the frequency region. Thus, mutual interference between the RF signal S1 and the pulse signal can be suppressed.

Second Embodiment

As described above, one of the specific example embodiments is described, but the embodiment described above is merely an example and does not limit the embodiment. For example, the embodiment described above exemplifies the mode in which mutual interference between the RF signal and the pulse signal can be suppressed due to the relationship between the carrier wave frequency fr of the RF signal and the first frequency being a reciprocal of the modulation speed of the pulse signal. Herein, moreover, in the signal transmission system 10, description is made on a configuration of the signal transmission system 10 according to the second embodiment that can suppress mutual interference between the RF signal and the pulse signal more, which is different from the first embodiment.

Figure 11:
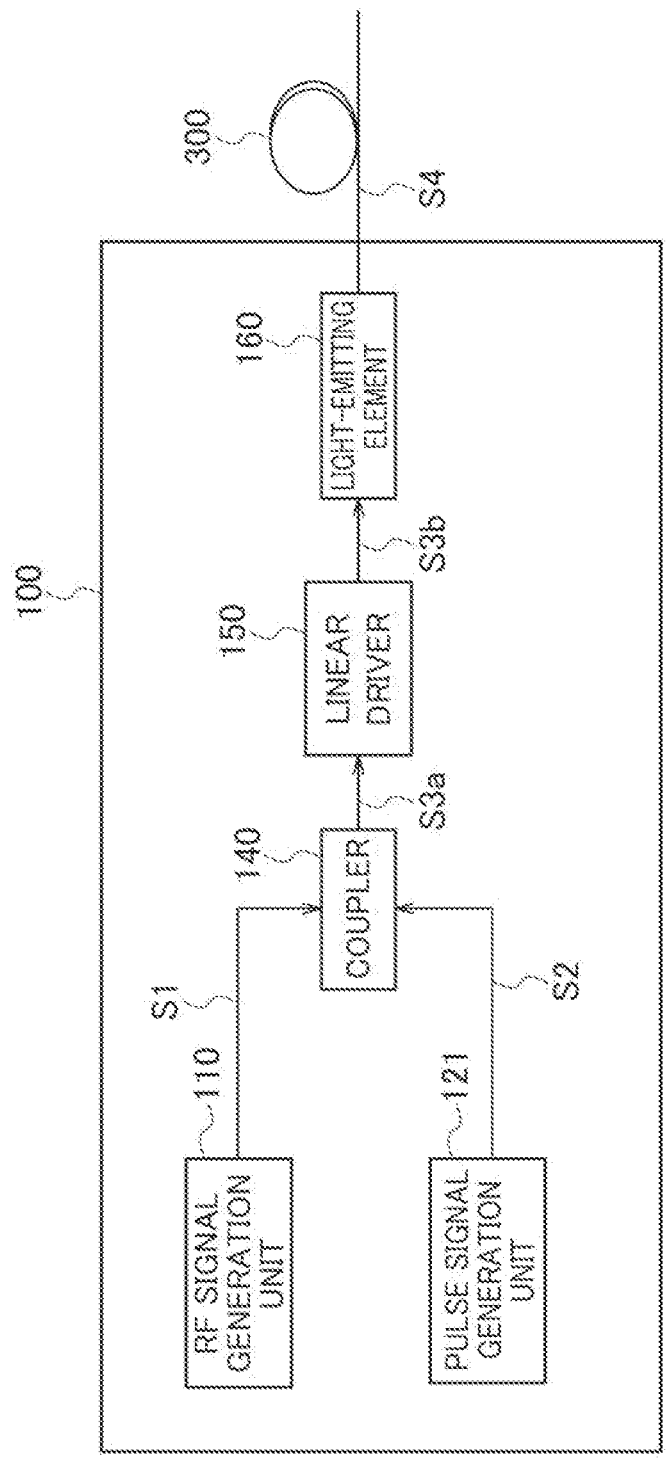
FIG. 11 is a block diagram illustrating a configuration of a transmission device according to a second embodiment.

FIG. 11 is a block diagram illustrating a configuration of the transmission device 100 of the signal transmission system 10 of the second embodiment.

In the second embodiment, as compared to the pulse signal generation unit 120 according to the first embodiment, a pulse signal generation unit 121 is capable of generating the pulse signal that suppresses interference with the carrier wave frequency fr of the RF signal more.

Figure 12A:
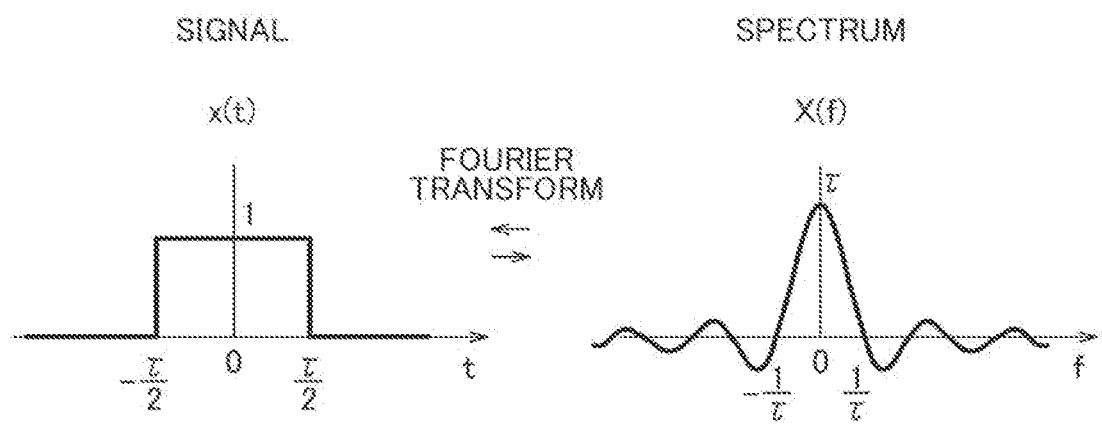
FIG. 12A is a diagram for describing a relationship between a pulse waveform and a frequency spectrum.
Figure 12B:
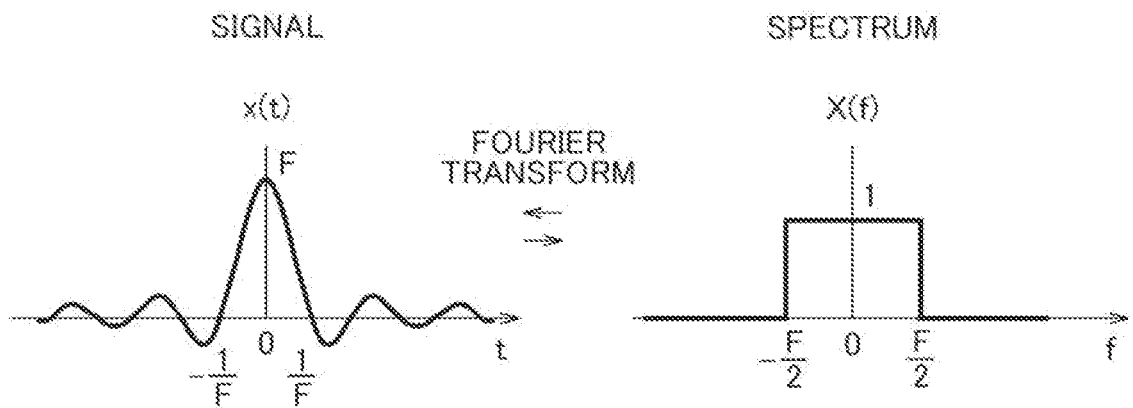
FIG. 12B is a diagram for describing the relationship between the pulse waveform and the frequency spectrum.

FIG. 12A and FIG. 12B are diagrams for describing a relationship between a pulse waveform and a frequency spectrum. For example, a relationship between a time axis of a pulse signal having a rectangular pulse that is generated by on-off keying (OOK) and a frequency axis (frequency spectrum) is established as the relationship illustrated in FIG. 12A. A waveform in the time axis illustrated in FIG. 12A is subjected to fast Fourier transform (FFT), and is indicated with the frequency axis (frequency spectrum). Further, the relationship between the time axis and the frequency axis that is illustrated in FIG. 12A is reversible. Thus, when a pulse shape in the time axis is equivalent to that in the frequency axis, a relationship opposite to the relationship illustrated in FIG. 12A can be obtained as illustrated in FIG. 12B. In other words, by generating the signal having the pulse shape in the frequency axis indicating the relationship illustrated in FIG. 12B, generation of the signal can be achieved while suppressing a high-frequency component.

In the second embodiment, the pulse signal generation unit 121 generates the pulse signal S2 as illustrated on the right side (frequency axis) of FIG. 12B by converting (modulating) the digital signal being input or generated, into the waveform illustrated on the left side (time axis) of FIG. 12B. Further, the pulse signal generation unit 121 outputs the pulse signal S2 being generated, to the coupling unit 140. Further, as an example of a pulse capable of suppressing a high-frequency component at the time of generation of the pulse signal by the pulse signal generation unit 121, a raised cosine pulse may be applied, for example. Note that, in the second embodiment, any pulse shape capable of suppressing a high-frequency component is applicable to the pulse signal that is generated by the pulse signal generation unit 121, and is not limited to the raised cosine pulse.

Figure 13:
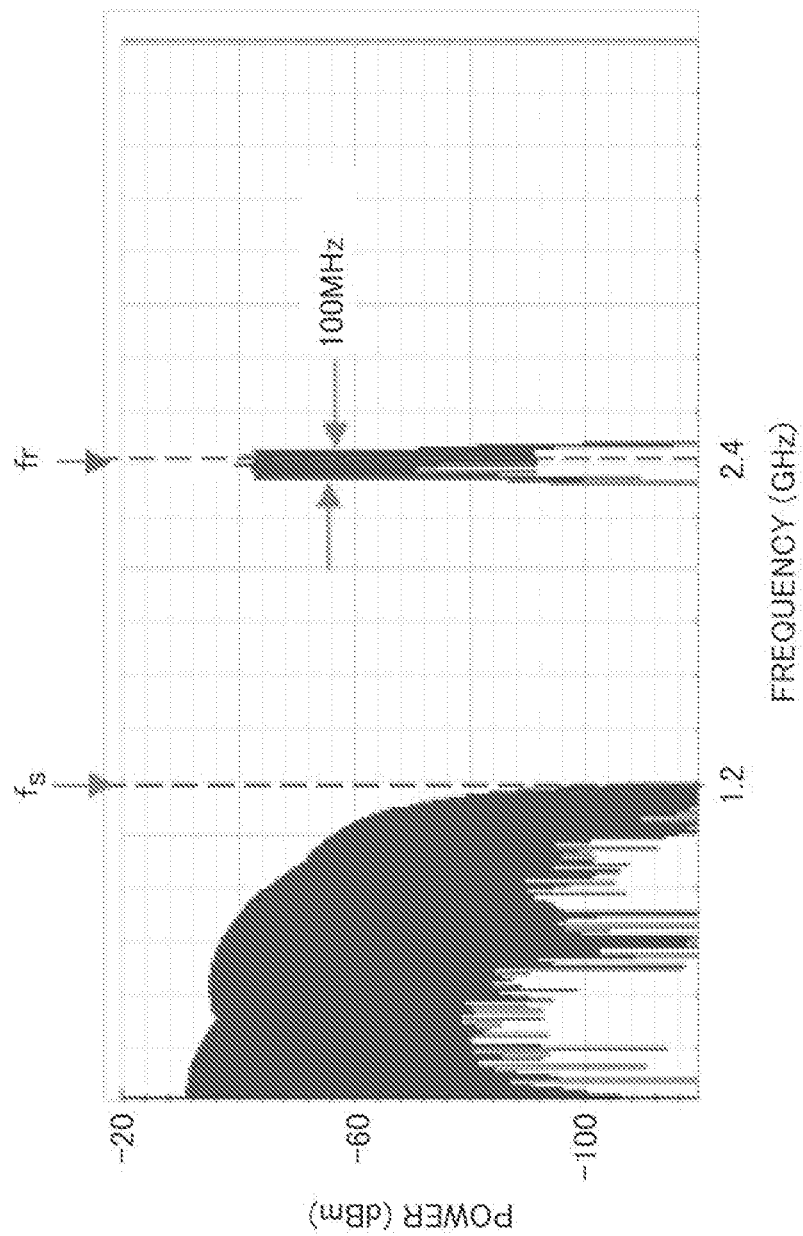
FIG. 13 is a diagram illustrating a frequency spectrum of a superimposed signal obtained by superimposing a pulse signal and an RF signal in the transmission device according to the second embodiment.

FIG. 13 illustrates a frequency spectrum of the superimposed optical signal S4 obtained by superimposing a pulse signal of 1.2 Gbps that has a raised cosine pulse and a 64-quadrature amplitude modulation orthogonal frequency division multiplexing (QAM OFDM) signal that has the carrier wave frequency fr of the RF signal S1, which is 2.4 GHz, and a bandwidth of 100 MHz. As illustrated in FIG. 13, in the superimposed optical signal S4 that is output from the transmission device 100 of the second embodiment, the waveform of the pulse signal and the waveform of the RF signal are present away from each other with respect to the frequency axis, and interference between the pulse signal and the RF signal is suppressed. Further, as illustrated in FIG. 13, the carrier wave frequency fr of the RF signal is 2.4 GHz, and the first frequency being a reciprocal of the modulation speed of the pulse signal is 1.2 GHz. In other words, in the second embodiment, the relationship in Expression (1) indicated in the first embodiment is also satisfied. Moreover, FIG. 13 illustrates a cases in which the natural number n is 2.

As described above, the pulse signal generation unit 121 according to the second embodiment may apply the raised cosine pulse to generate the pulse signal, the raised cosine pulse capable of suppressing a high-frequency component.

With this, the transmission device 100 can suppress mutual interference between the RF signal S1 and the pulse signal more securely.

Further, in the first embodiment, as illustrated in FIG. 5, the width of the bottom where power of the frequency of the pulse signal is 0 is narrow, and hence the band width of the RF signal capable of suppressing an influence of the pulse signal is limited. Meanwhile, in the second embodiment, as illustrated in FIG. 13, signal power is not present in a frequency equal to or higher than the first frequency fs, and hence the RF signal having a wide band width can be superimposed.

Further, in the first embodiment in which the natural number n in Expression (1) given above is equal to or greater than 2, Expression (2) given above is applicable.

Third Embodiment

Next, a third embodiment is described. Note that, in the following description, when the same reference symbols as those in the first embodiment and/or the second embodiment are used, the same configurations as those in the first embodiment and/or the second embodiment are indicated, and reference is made to the preceding description unless otherwise noted. Herein, in the signal transmission system 10, description is made on a configuration of the signal transmission system 10 according to the third embodiment that dynamically performs setting of set values for the pulse signal generation units 120 and 121 and digital filters 233 and 243, which is different from the first embodiment and/or the second embodiment.

Figure 15:
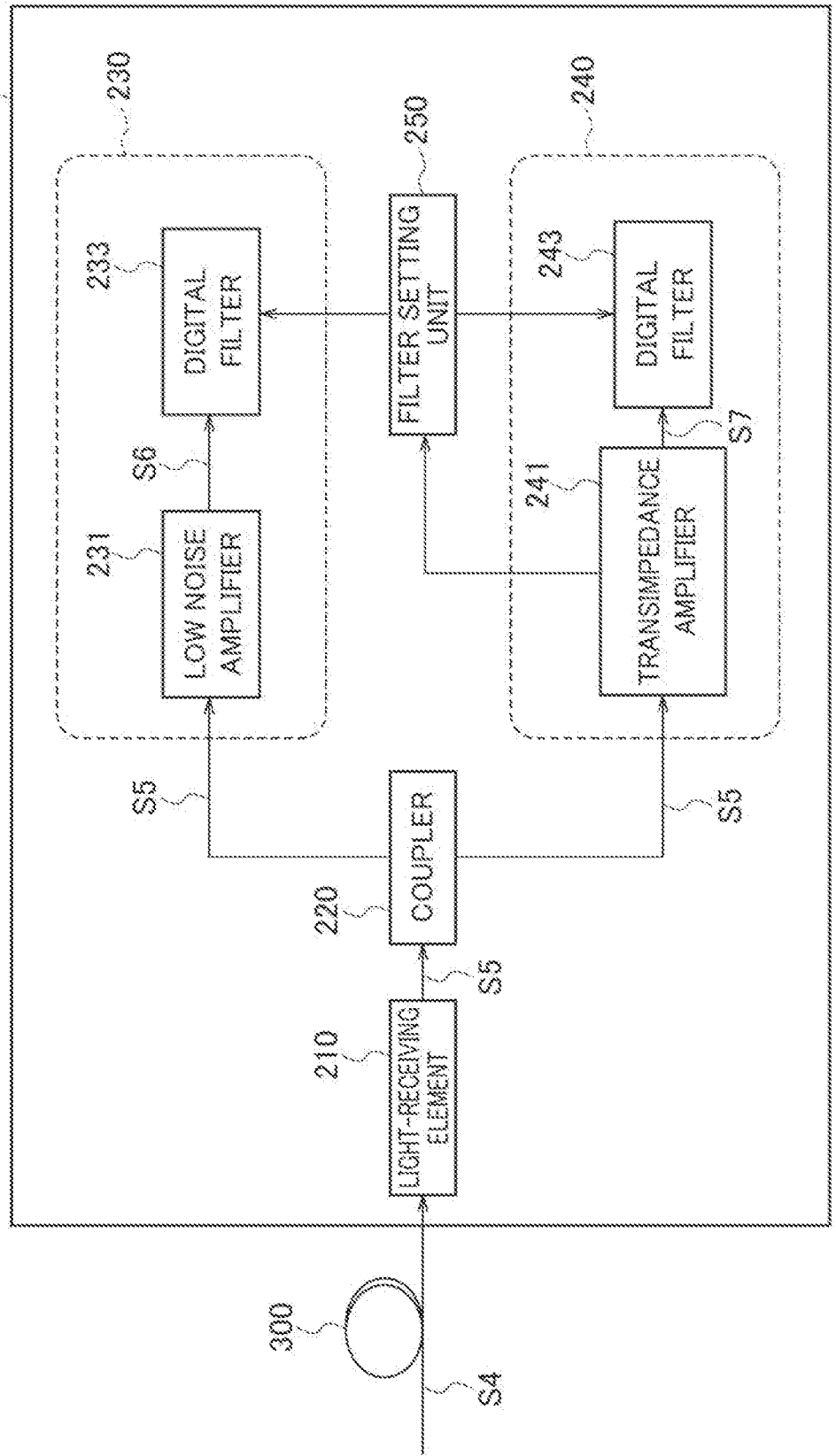
FIG. 15 is a block diagram illustrating a reception device according to the third embodiment.

FIG. 14 illustrates a block diagram of the transmission device 100 according to the third embodiment. Further, FIG. 15 illustrates a block diagram of the reception device 200 according to the third embodiment. The transmission device 100 according to the third embodiment is different from the transmission device 100 according to the first embodiment in that an arithmetic processing unit 170 is provided. Further, the reception device 200 according to the third embodiment is different from the reception device 200 according to the first embodiment in that a filter setting unit 250 is provided.

First, in the signal transmission system 10 according to the third embodiment, only the RF signal is transmitted from the transmission device 100 to the reception device 200. In this case, for example, the pulse signal generation unit 120 is set in such a way to stop the operation, and thus only the RF signal is transmitted.

The RF signal that is transmitted to the reception device 200 is subjected to fast Fourier transform (FFT) by the demodulation unit (omitted in illustration) of the reception device 200, and the carrier wave frequency fr of the RF signal is extracted.

The arithmetic processing unit 170 of the transmission device 100 acquires the carrier wave frequency fr from the reception device 200 by a predetermined means. In the present embodiment, as the predetermined means, there may be adopted a configuration in which the arithmetic processing unit 170 acquires the carrier wave frequency fr directly from the demodulation unit (omitted in illustration) of the reception device 200. Alternatively, there may be adopted a configuration in which the carrier wave frequency fr is transmitted to the arithmetic processing unit 170 of the transmission device 100 via an external control device (omitted in illustration) that receives an output signal from the demodulation unit (omitted in illustration) of the reception device 200.

When a plurality of carrier wave frequencies fr are present, the arithmetic processing unit 170 calculates an order and a cut-off frequency fc for transmission power of the pulse signal in such a way that all the carrier wave frequencies fr falling within a frequency range that can be demodulated by the pulse signal demodulation unit (omitted in illustration) are equal to or less than 20 dB. Note that, in the second embodiment, the arithmetic operation for obtaining the order and the frequency by the arithmetic processing unit 170 is executed based on Expressions (2) to (4) given above. Information relating to the order and the cut-off frequency fc that are calculated by the arithmetic processing unit 170 is transmitted with the pulse signal from the transmission device 100 and the reception device 200, and is set for the digital filter 233 and the digital filter 243 of the reception device 200.

Further, the pulse signal generation unit 120 determines the modulation speed T of the pulse signal, based on the first frequency fs that is obtained by the arithmetic operation of the arithmetic processing unit 170, and generates the pulse signal S2, based on the modulation speed.

As described above, in the third embodiment, the transmission device 100 of the signal transmission system 10 further includes the arithmetic processing unit 170. Further, the reception device 200 further includes the digital filters 233 and 243 and the filter setting unit 250. the RF signal demodulation unit 230 extracts the frequency of the RF signal, based on the RF signal being demodulated. Further, the arithmetic processing unit 170 calculates the modulation speed of the pulse signal, based on the frequency of the RF signal that is extracted by the RF signal demodulation unit 230. Further, the filter setting unit 250 calculates the orders and the values of the cut-off frequencies of the digital filters 233 and 243, based on the frequency and the first frequency of the RF signal.

With this, the signal transmission system 10 according to the third embodiment is capable of setting the modulation speed of the pulse signal in the pulse signal generation unit and the set values for the digital filters 233 and 243 dynamically according to the carrier wave frequency fr. Thus, the signal transmission system 10 can suppress mutual interference between the RF signal S1 and the pulse signal more flexibly according to the system configuration.

Other Embodiments

The embodiments are described in detail with reference to the drawings, but the present embodiments are not limited by the contents described in the embodiments given above. Further, the constituent elements described above include elements that are easily conceived by a person skilled in the art and substantially the same elements. Moreover, the configurations described above may be combined with each other as appropriate. Further, various omissions, replacements, and modifications may be made to the configurations without departing from the gist of the embodiments.

Features of the transmission device 100 and the signal transmission system 10 are described below.

According to a first aspect, the transmission device 100 includes the RF signal generation unit 110 that generates the RF signal S1 to be modulated by the carrier wave. Further, the transmission device 100 includes the pulse signal generation unit 120 that generates the pulse signal S2. Further, the transmission device 100 includes the coupling unit 140 that couples the RF signal S1 and the pulse signal S2 to each other and generates the superimposed signal. Further, the transmission device 100 includes the linear driver 150 that amplifies the superimposed signal and generates the amplified signal. Moreover, the transmission device 100 includes the light-emitting element 160 that converts the amplified signal into the optical signal and generates the superimposed optical signal. The pulse signal generation unit 120 generates the pulse signal in such a way to satisfy $$fr = n \times fs \qquad (1)$$

where fr is the frequency of the RF signal, fs is the first frequency being a reciprocal of the modulation speed of the pulse signal, and n is the natural number.

With the configuration described above, the transmission device 100 can suppresses mutual interference between the RF signal S1 and the pulse signal. Further, as compared to a signal transmission method involving wavelength multiplexing in the related art, the transmission device 100 does not require a plurality of light sources or wavelength filters, can suppress increase in the number of constituent components in the system, and can suppress manufacturing costs by suppressing increase in the size of the system.

According to a second aspect, in the transmission device 100, the natural number n in Expression (1) given above is equal to or greater than 2.

With the configuration described above, in the transmission device 100, the carrier wave frequency fr of the RF signal is equal to or greater than twice the first frequency fs being a reciprocal of the modulation speed of the pulse signal, and is located at the bottom of the signal where power of the pulse signal is close to 0 in the frequency region. Thus, mutual interference between the RF signal S1 and the pulse signal can be suppressed.

According to a third aspect, the pulse signal generation unit 120 of the transmission device 100 may apply the raised cosine pulse to generate the pulse signal, the raised cosine pulse being capable of suppressing a high-frequency component.

With the configuration described above, the transmission device 100 can suppress mutual interference between the RF signal S1 and the pulse signal more securely.

According to a fourth aspect, the signal transmission system 10 includes the transmission device 100 described above, the transmission path 300 that transmits the superimposed optical signal output from the transmission device 100, and the reception device 200 that receives the superimposed optical signal from the transmission path 300. The reception device 200 includes the light-receiving element 210 that receives the superimposed optical signal and converts the superimposed optical signal into the superimposed electric signal. Further, the reception device 200 includes the splitting unit that splits the superimposed electric signal. Further, the reception device 200 the RF signal demodulation unit 230 that amplifies one part of the superimposed electric signal being split by the splitting unit and demodulates the one part to the RF signal. Further, the reception device 200 includes the pulse signal demodulation unit 240 that amplifies another part of the superimposed electric signal being split by the splitting unit and demodulates the another part to the pulse signal.

With the configuration described above, the signal transmission system 10 can suppress mutual interference between the RF signal and the pulse signal. As compared to a signal transmission method involving wavelength multiplexing in the related art, the transmission device 100 does not require a plurality of light sources or wavelength filters, can suppress increase in the number of constituent components in the system, and can suppress manufacturing costs by suppressing increase in the size of the system.

According to a fifth aspect, the pulse signal demodulation unit 240 of the signal transmission system 10 may include the low pass filter 242 with the cut-off frequency fc satisfying the relationships indicated by $$0.6 \times fs \leq fc(\gamma \geq 4) \leq 1 \times fs \quad (2)$$

$$0.6 \times fs \leq fc(\gamma) \leq 0.75 \times fs \quad (3)$$

$$fc(\gamma \geq 7) \leq 0.75 \times fs \quad (4)$$

where fs is the first frequency being a reciprocal of the modulation speed of the pulse signal, and γ is the order.

With the configuration described above, the signal transmission system 10 includes the low pass filter satisfying Expressions (2) to (4), and thus enables demodulation of the RF signal and the pulse signal while suppressing an influence of interference between the signals.

According to a sixth aspect, the transmission device 100 of the signal transmission system 10 may further include the arithmetic processing unit 170. Further, the reception device 200 may further include the digital filters 233 and 243 and the filter setting unit 250. Further, the RF signal demodulation unit 230 may extract the frequency of the RF signal, based on the RF signal being demodulated. Further, the arithmetic processing unit 170 may calculate the modulation speed of the pulse signal, based on the frequency of the RF signal that is extracted by the RF signal demodulation unit 230. Further, the filter setting unit 250 may calculate the order and the value of the cut-off frequency of the digital filter, based on the frequency and the first frequency of the RF signal.

With this, the signal transmission system 10 is capable of setting the modulation speed of the pulse signal in the pulse signal generation unit and the set values for the digital filters 233 and 243 dynamically according to the carrier wave frequency fr. Thus, the signal transmission system 10 can suppress mutual interference between the RF signal S1 and the pulse signal more flexibly according to the system configuration.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A transmission device, comprising:
an RF signal generation unit configured to generate an RF signal to be modulated by a carrier wave;
a pulse signal generation unit configured to generate a pulse signal;
a coupling unit configured to couple the RF signal and the pulse signal to each other and generate a superimposed signal;
a linear driver configured to amplify the superimposed signal and generate an amplified signal; and
a light-emitting element configured to convert the amplified signal to an optical signal and generate a superimposed optical signal, wherein
the pulse signal generation unit generates the pulse signal in such a way to satisfy $$fr = n \times fs \quad (1)$$

where fr is a frequency of the RF signal, fs is a first frequency being a reciprocal of a modulation speed of the pulse signal, and n is a natural number, and
the pulse signal generation unit applies a raised cosine pulse to generate the pulse signal, the raised cosine pulse being capable of suppressing a high-frequency component.

2. The transmission device according to claim 1, wherein the natural number n is equal to or greater than 2.

3. A signal transmission system, comprising:
the transmission device according to claim 1;
a transmission path configured to transmit the superimposed optical signal output from the transmission device; and
a reception device configured to receive the superimposed optical signal from the transmission path, wherein
the reception device includes:
a light-receiving element configured to receive the superimposed optical signal and convert the superimposed optical signal into a superimposed electric signal;
a splitting unit configured to split the superimposed electric signal;
an RF signal demodulation unit configured to amplify one part of the superimposed electric signal being split by the splitting unit and demodulate the one part to the RF signal; and
a pulse signal demodulation unit configured to amplify another part of the superimposed electric signal being split by the splitting unit and demodulate the another part to the pulse signal.

4. A signal transmission system, comprising:
a transmission device comprising:
an RF signal generation unit configured to generate an RF signal to be modulated by a carrier wave,
a pulse signal generation unit configured to generate a pulse signal,
a coupling unit configured to couple the RF signal and the pulse signal to each other and generate a superimposed signal,
a linear driver configured to amplify the superimposed signal and generate an amplified signal, and
a light-emitting element configured to convert the amplified signal to an optical signal and generate a superimposed optical signal, wherein
the pulse signal generation unit generates the pulse signal in such a way to satisfy
fr=n×fs, where fr is a frequency of the RF signal, fs is a first frequency being a reciprocal of a modulation speed of the pulse signal, and n is a natural number;
a transmission path configured to transmit the superimposed optical signal output from the transmission device; and
a reception device configured to receive the superimposed optical signal from the transmission path, wherein
the reception device includes:
a light-receiving element configured to receive the superimposed optical signal and convert the superimposed optical signal into a superimposed electric signal;
a splitting unit configured to split the superimposed electric signal;
an RF signal demodulation unit configured to amplify one part of the superimposed electric signal being split by the splitting unit and demodulate the one part to the RF signal; and a pulse signal demodulation unit configured to amplify another part of the superimposed electric signal being split by the splitting unit and demodulate the another part to the pulse signal, wherein the pulse signal demodulation unit includes a low pass filter with a cut-off frequency fc satisfying relationships indicated by $$0.6 \times fs \leq fc(\gamma \geq 4) \leq 1 \times fs \quad (2)$$

$$0.6 \times fs \leq fc(\gamma) \leq 0.75 \times fs \quad (3)$$

$$fc(\gamma \geq 7) \leq 0.75 \times fs \quad (4)$$

where fs is the first frequency being the reciprocal of the modulation speed of the pulse signal, and γ is an order.

5. A signal transmission system, comprising:
a transmission device comprising:
   an RF signal generation unit configured to generate an RF signal to be modulated by a carrier wave,
   a pulse signal generation unit configured to generate a pulse signal,
   a coupling unit configured to couple the RF signal and the pulse signal to each other and generate a superimposed signal,
   a linear driver configured to amplify the superimposed signal and generate an amplified signal, and
   a light-emitting element configured to convert the amplified signal to an optical signal and generate a superimposed optical signal, wherein
the pulse signal generation unit generates the pulse signal in such a way to satisfy
fr=n×fs, where fr is a frequency of the RF signal, fs is a first frequency being a reciprocal of a modulation speed of the pulse signal, and n is a natural number;

a transmission path configured to transmit the superimposed optical signal output from the transmission device; and
a reception device configured to receive the superimposed optical signal from the transmission path, wherein
the reception device includes:
   a light-receiving element configured to receive the superimposed optical signal and convert the superimposed optical signal into a superimposed electric signal;
   a splitting unit configured to split the superimposed electric signal;
   an RF signal demodulation unit configured to amplify one part of the superimposed electric signal being split by the splitting unit and demodulate the one part to the RF signal; and
   a pulse signal demodulation unit configured to amplify another part of the superimposed electric signal being split by the splitting unit and demodulate the another part to the pulse signal, wherein
the transmission device further includes an arithmetic processing unit,
the reception device further includes a digital filter and a filter setting unit,
the RF signal demodulation unit extracts the frequency of the RF signal, based on the RF signal being demodulated,
the arithmetic processing unit calculates the modulation speed of the pulse signal, based on the frequency of the RF signal that is extracted by the RF signal demodulation unit, and
the filter setting unit calculates an order and a value of a cut-off frequency of the digital filter, based on the frequency and the first frequency of the RF signal.

* * * * *